United States Patent [19]

Swartz

[11] Patent Number: 4,790,998
[45] Date of Patent: Dec. 13, 1988

[54] BEVERAGE CLOUD BASED ON A WHEY PROTEIN-STABILIZED LIPID

[75] Inventor: Marsha L. Swartz, Santa Rosa, Calif.

[73] Assignee: New Zealand Milk Products, Inc., Petaluma, Calif.

[21] Appl. No.: 945,344

[22] Filed: Dec. 22, 1986

[51] Int. Cl.$^4$ ............................................. A23C 21/00
[52] U.S. Cl. .................................... 426/585; 426/590; 426/602
[58] Field of Search ............... 426/601, 602, 580, 585, 426/590, 98

[56] References Cited

U.S. PATENT DOCUMENTS

| | | | |
|---|---|---|---|
| 3,617,302 | 11/1971 | Collins | 426/98 |
| 3,658,552 | 4/1972 | Carlson et al. | |
| 3,660,105 | 5/1972 | Kesterson et al. | |
| 3,922,375 | 11/1975 | Dalan et al. | 426/491 |
| 3,959,510 | 5/1976 | Felton et al. | |
| 4,084,012 | 4/1978 | Krumel et al. | |
| 4,086,367 | 4/1978 | Ziccarelli | 426/98 |
| 4,187,326 | 2/1980 | Serafino et al. | |
| 4,279,940 | 7/1981 | Wurzburg et al. | |
| 4,335,143 | 6/1982 | Weiner et al. | |
| 4,349,577 | 9/1982 | Tessler | |
| 4,388,330 | 6/1983 | Wobben et al. | |
| 4,411,926 | 10/1983 | Trumbetas et al. | 426/565 |
| 4,479,971 | 10/1984 | Eng et al. | |
| 4,508,744 | 4/1985 | Kruger et al. | |
| 4,529,613 | 7/1985 | Mezzino et al. | |
| 4,615,900 | 10/1986 | Schenz et al. | 426/590 |
| 4,746,527 | 5/1988 | Kuypers | 426/590 |

OTHER PUBLICATIONS

G. F. Phillips and J. G. Woodruff, Beverage Acids, Flavors, Colors and Emulsifiers, Chapt. 5 in "Beverages: Carbonated and Noncarbonated", The AVI Publishing Company, Westport, Connecticut.
V. R. Kaufman and N. Garti, Effect of Cloudy Agents on the Stability and Opacity and Cloudy Emulsions for Soft Drinks Journal of Food and Technology 19: 255–261.
A. L. Lehninger, Biochemistry, Worth Publishers, Inc. New York, NY (1975).

Primary Examiner—Donald E. Czaja
Assistant Examiner—Carolyn Paden
Attorney, Agent, or Firm—Cooper & Dunham

[57] ABSTRACT

Clouding or creaming agents useful for still or carbonated beverages, especially acid types, are prepared by forming a dispersion of whey proteins and a lipid system, acidifying to a pH of about 1.0 to 4.5 then heating and homogenizing the solution to form a stable emulsion. The emulsion can be used as a liquid concentrate to impart opacity to a beverage at low use levels. It may be added at higher levels to impart a creamy, milky flavor and a smooth, full mouthfeel. The emulsion may also be dried for use in dry beverage mixes.

13 Claims, No Drawings

BEVERAGE CLOUD BASED ON A WHEY PROTEIN-STABILIZED LIPID

BACKGROUND OF THE INVENTION

Fruit juice has a characteristic cloudiness prior to clarification. This is the result of minute, light scattering particles which are suspended throughout the beverage. The particulate matter can be removed to produce a clear beverage as in the case of clarified apple juice. However, many juices are manufactured without clarification because the pulpy, cloudy appearance is considered more "natural" and desirable by some consumers. To impart a natural appearance to formulated beverages, a clouding agent is often added to impart opacity. Opacity or cloudiness may be achieved by the addition of either suspension stable particulate matter or a stable emulsion system. The cloudy effect is achieved when light is refracted and scattered due to the presence of minute particles or droplets.

The majority of clouding agents are emulsions based on both natural and synthetic compounds. A typical clouding agent could contain gum acacia, vegetable oil or citrus oils, brominated vegetable oil and/or approved soluble gum, water, citric acid and sodium benzoate or other approved preservatives. In formulating a clouding agent, it is critical to select proper ratios of these ingredients in order to achieve high levels of cloudiness as well as stability. In addition, the specific gravity in the oil phase of the emulsion must be carefully balanced. Finished cloud densities should be identical to the density of the beverage for maximum stability; ideal densities range from about 0.96 to 1.06 grams per cubic centimeter depending on the solids content of the beverage. The primary oil component of a beverage cloud is either vegetable or citrus oil, which have specific gravities in the range of 0.8 to 0.9 g/cc. These oils must be weighted with a heavier component in order to form a particle of proper density. In the past, brominated vegetable oil (BVO) was the weighting agent of choice because it had a specific gravity of 1.30 g/cc and therefore could be used at relatively low levels. However, in July 1970 the FDA placed an interim limitation on the use of BVO of 15 ppm in the finished beverage. Because of the low allowed use level, alternative weighting agents are required. Weighting agents which have been used in the U.S. or other countries include sucrose diacetate, hexaisobutyrate and rosin esters such as glycerol ester of wood rosin. Unfortunately these weighting agents are synthetic and their current or continued approval for food/beverage use is either prohibited or under review by the FDA.

An ideal clouding agent for use in formulated beverages would contain only ingredients which are permitted without limitation on usage. In addition, it would be desirable if the ingredients were naturally rather than synthetically derived. In use, clouding agents should produce an opaque beverage which does not ring, sediment, flocculate or diminish in cloud capacity upon standing over long periods of time, i.e., at least three to six months. The flavor and odor should be clean so as to allow the product to be used at high levels and to produce a creamy mouthfeel and flavor in addition to opacity.

The present invention relates to the use of whey protein-stabilized emulsions as clouding or creaming agents for beverages, especially acidic fluids. The invention also comprises drinks and materials used in their manufacture when prepared according to the process of the invention.

SUMMARY OF THE INVENTION

The present invention provides a composition of matter useful as a beverage clouding agent. This composition of matter comprises a whey protein-stabilized lipid emulsified in an acidic aqueous solution.

Also provided is a method for preparing a beverage cloud. This method comprises mixing a predetermined amount of a lipid with a suitable amount of whey protein so as to produce a lipid/whey protein dispersion with a lipid to whey protein weight ratio from about 1:4 to about 4:1. A suitable amount of an edible, food grade acid is added to the lipid/whey protein dispersion so as to produce a composition of matter with a pH from about 1.0 to about 4.5. This acidified dispersion may be homogenized by methods known in the art to produce a stabilized emulsion useful as a beverage clouding agent.

DETAILED DESCRIPTION OF THE INVENTION

The clouding agent of the present invention is an emulsified composition of lipids and whey proteins in an acid environment. The clouding agent may also be flavored using components such as orange or lemon oil. The important features of the invention include the balancing of the lipid system and the use of whey protein at pH levels of less than 4.5 to achieve acid emulsification stability. All ingredients are natural, i.e., unmodified from the form typically found in nature.

The lipid component may be composed of one or a number of water insoluble components, including glycerides, phosphoglycerides, sterols, waxes, terpenes, etc. Specific examples include vegetable oil, partially hydrogenated vegetable oil, animal fat, lecithin, essential plant oils, etc. The components vary in their densities, for example, the approximate specific gravities of orange oil, milkfat and lecithin are 0.8, 0.9 and 1.0 g/cc respectively.

The protein component of the present invention is whey based. Within this application, "whey protein" means one or more proteins derived from whey which are soluble at their isoelectric points. Examples of whey proteins include proteins from milk and soybean which are not precipitated in the pH range of 4 to 5. Whey protein is a critical component of the present invention because it is an excellent emulsifier in acid systems. It will stabilize the lipid system by forming a protective layer on the surface of the fat particle. This layer prevents fat particles from colliding and coalescing. It also increases the density of the lipid particle since the proteins have densities greater than 1.0 g/cc.

The pH at which most proteins are least soluble is termed the isoelectric point of the protein, i.e., the pH at which the molecule has no net electric charge. Under these conditions there is no electrostatic repulsion between neighboring protein molecules and they tend to coalesce and precipitate. However, if pH values are above or below the isoelectric point, all the protein molecules have a net charge of the same sign. They therefore repel each other, preventing coalescence of single molecules into insoluble aggregates. In the cloud system, whey proteins are used because they do not aggregate at the isoelectric point, e.g., whey proteins from milk are soluble throughout the pH range. This property is important in order to maintain the protein surrounded lipid particles from interacting to form larger particles which could reduce cloud capacity and/or form a sediment or ring in the finished beverage. When the clouding agent is prepared at pH levels that deviate from the isoelectric point, an improvement is seen in the reduction of sediment. This is due to a reduction of protein-protein interactions resulting from electric charge repulsion.

The effective density of a beverage cloud is the density of the protein emulsified lipid particles. The particles must be in balance with the finished beverage in order to achieve a stable cloud beverage. An ideal beverage cloud/creaming agent for dietetic beverages containing saccharin or aspartame has an effective density in the range of 0.96 to 1.00 g/cc. For beverages sweetened with a sugar such as sucrose, fructose or other sugars, the density must be in the range of 1.00 to 1.06 g/cc, depending on sweetener concentration. A 12% sucrose beverage should contain a cloud with an effective density in the range of 1.04 to 1.05 g/cc.

To achieve the proper cloud density, a balanced lipid and protein formulation must be employed. The lipid system density may be varied substantially in the range of 0.8 to 1.10 g/cc based on the selection of the lipid components. Lipid densities cover a wide range due to variable structures within this class of compounds, including variations in the level of phosphate groups, hydrogenation, hydroxyl groups, cyclic end groups, etc. The lipid component should be balanced so that the density is at least 0.85 but not more than 1.03 g/cc.

Homogenization will cause the protein to form a thin film around minute lipid particles. Ideally, the emulsified droplets will be approximately one micron in diameter, yet particles in the range of 10 to 0.1 microns have been found to be stable. The size of the particle and the pH of the solution determine the thickness of the protein film which stabilizes the lipid system. A lower density lipid system will require a higher amount of surface protein, which may be achieved by adjustment of protein charge through pH modification or a reduction in homogenized particle size.

Effective ratios of lipid to protein have been found to be in the range of 1:4 to 4:1, with preferred levels in the range of 1:2 to 2:1. The level of protein in the emulsified particle is actually less than indicated by the protein to lipid ratio. This is a result of the homogenization process not converting 100% of the soluble protein to the protein film, i.e., some protein remains in solution. Therefore an excess of protein must be added to achieve the desired protein level on the surface of the cloud particle.

The pH of the beverage cloud during manufacture will also determine its stability in the finished beverage system. Effective pH levels for acceptable clouds used in acid beverages are between 1.0 and 4.5, with preferred levels in the range of 1.5 to 3.0. Suitable edible, food grade acids, e.g., citric acid and phosphoric acid, are used to acidify the lipid/whey protein dispersions.

Additionally, the beverage clouding agent of the present invention may be dried so as to form a powder useful as a dry beverage mix clouding agent. Methods for drying high fat powders are known in the art and include, but are not limited to, spray drying and lyophilizing. Moreover, a suitable carrier such as corn syrup solids may be added to the emulsified beverage cloud so as to facilitate drying.

The invention is more fully described, but not limited by, the following examples.

EXAMPLE 1

A liquid cloud was formulated to contain 7.6% whey protein derived from milk, 4.5% soybean oil and 10.0% citric acid. The whey protein was derived from a 55% whey protein concentrate (WPC) manufactured by ultrafiltration. The clouding agent was produced by adding 45 grams of soybean oil to 855 grams of a 16.2% WPC solution. The dispersion was mixed on a stirring hot plate and then heat was applied. At 35° C., 100 grams of citric acid were added to reduce the pH to 2.2. Heating was continued to 75° C. The solution was held at 75° C. for five minutes, then homogenized using a two stage homogenizer set at 4500 and 500 psi first and second stages respectively. The homogenized liquid was immediately cooled to 20° C. using an ice bath. The concentrate was tempered overnight.

To prepare cloudy, orange beverages, concentrate was added to a 60% solids syrup containing the sucrose, acids and color. The syrup was mixed then added to glass bottles and diluted appropriately with 0° to 4° C. carbonated water and immediately capped which resulted in a beverage with approximately two to three volumes of $CO_2$. Finished beverages had the following composition:

| Sucrose | 13% |
| --- | --- |
| Citric Acid | 0.17% |
| FD & C yellow #6 | 33 ppm |
| Carbonated water | to 100% |

Several bottles of beverage were prepared. Some were measured for absorbance at 575 nm in order to determined cloud capacity. Others were placed on the window sill and in the refrigerator for determination of stability. The results of the evaluation indicated that 4000 ppm of cloud concentrate were sufficient to produce an absorbance reading of greater than 0.5. (The target absorbance for cloudy carbonated fruit-flavored beverages is approximately 0.4 to 0.7). In addition, the clouds were stable to room and refrigerated temperatures. No significant level of sediment, fat ring or flocculation was observed over a period of three months. The flavor and odor remained clean and bland.

EXAMPLE 2

A flavored beverage cloud was formulated to contain 6.5% whey protein derived from milk, 3.3% soybean lecithin, 1.7% coconut oil, 1.3% orange oil and 2.6% phosphoric acid. The denser lecithin lipid fraction was used to balance the lower density orange oil component. The clouding agent was produced by adding 50 grams of lecithin, 25 grams of coconut oil and 20 grams of orange oil to 1360 grams of a 13% solution of WPC (55% protein). The dispersion was mixed on a stirring hot plate and then heat was applied. At 40° C., 45 grams of concentrated phosphoric acid were added to the mixture which reduced the pH to 1.8. Heating was continued to 71° C., then the solution was homogenized and cooled as previously described in Example 1. The cloud concentrate was evaluated using the aforementioned procedure. A cloud level of 4000 ppm in the finished beverage resulted in an orange oil level of 52 ppm, which is within the recommended level for an orange flavored carbonated beverage. The beverage had the desired opacity (absorbance of 0.6 at 575 nm). In addition, the product was stable to room and refrigerated conditions for over twelve weeks.

EXAMPLE 3

A clouding, creaming agent was prepared using the following formulation: 7.0% whey protein, 6.0% anhydrous milkfat (less than 1.0% moisture), 1.5% phosphoric acid and 0.05% lemon oil. The whey protein was an isolate which was manufactured using an exchange resin to produce a final protein content of 90%. The clouding concentrate was prepared by adding a mixture of 0.5 grams of lemon oil and 60 grams of anhydrous milkfat at 40° C. to 920 grams of a 8.5% whey protein isolate solution at 40° C. The dispersion was mixed on a stirring hotplate and then 18 grams of phosphoric acid were added. Heat was applied to increase the temperature of the mixture to 75° C. The solution was then homogenized and cooled as previously described.

The tempered cloud concentrate was used to prepare a beverage of the following composition:

|  |  |
|---|---|
| Cloud concentrate | 12% |
| Sucrose | 12% |
| Sodium citrate | 0.05% |
| Carbonated water | to 100% |

The resulting beverage was very white with a pleasant creamy-lemon flavor. The beverage opacity was greater than 1.0 at 575 nm, ideal for a creamy appearing beverage. In addition, the beverage did not flocculate or precipitate in a twelve week storage study. Minimal ringing was observed in this time period. EXAMPLE 4

An unstable concentrate was formulated using the following ingredients: 1.0% whey protein, 8.5% coconut oil and 1.0% phosphoric acid. The whey protein was derived from the 55% WPC manufactured by ultrafiltration. The cloud concentration was prepared and evaluated using the procedures described in Example 1. The finished beverage contained 4000 ppm of concentrate and flocculated within one hour of preparation. The flocculated material aggregated in the beverage within 24 hours leaving a minimally cloudy beverage with a one inch cloud ring at the surface of the beverage. This ring was formed due to an improper protein-fat ratio, i.e., the fat level was too high, which resulted in a low density cloud that was unstable in the 12% sucrose beverage.

What is claimed is:

1. A beverage clouding agent which comprises a whey protein-stabilized lipid emulsified in an acidic aqueous solution having a pH within a range from about 1.0 to about 4.5, the beverage clouding agent having a lipid to whey protein weight ratio within a range from about 1:4 to about 4:1 and a lipid density within a range from about 0.8 to about 1.10 grams per cubic centimeter.

2. A beverage clouding agent of claim 1, wherein the acidic aqueous solution has a pH within the range from about 1.5 to about 3.0.

3. A beverage clouding agent of claim 1 which comprises two or more whey protein-stabilized lipids.

4. A beverage clouding agent of claim 1 having a lipid to whey protein weight ratio within the range from about 1:2 to about 2:1.

5. A beverage clouding agent of claim 1, wherein the lipid has a density within the range from about 0.85 to about 1.03 grams per cubic centimeter.

6. A beverage clouding agent of claim 1, wherein the lipid is a glyceride, phosphoglyceride, sterol, wax or terpene.

7. A beverage clouding agent of claim 1 which additionally comprises a flavoring agent.

8. A powder useful as a clouding agent for dry beverage mixes which comprises the dried, whey protein-stabilized lipid emulsion composition of claim 1.

9. A powder of claim 8 which additionally comprises an edible, food grade carrier.

10. A beverage which comprises a beverage clouding agent of claim 1 and a potable liquid.

11. A method for preparing a beverage clouding agent which comprises:
   (a) mixing a predetermined amount of a lipid with a suitable amount of whey protein so as to produce a lipid/whey protein dispersion with a lipid to whey protein weight ratio from about 1:4 to about 4:1;
   (b) adding a suitable amount of an edible, food grade acid to the lipid/whey protein dispersion so as to maintain the pH of the dispersion in the range from about 1.0 to about 4.5; and
   (c) homogenizing the dispersion so as to produce a stabilized beverage clouding agent.

12. A method for preparing a powder useful as a clouding agent for dry beverage mixes which comprises preparing a beverage clouding agent according to the method of claim 11 and drying it so as to form a powder.

13. A method according to claim 12, wherein an edible, food grade carrier is added to the beverage clouding agent prior to drying.

* * * * *